INVENTOR.
ROBERT R. APPLEGATE
BY Bates, Golrick & Teare
ATTORNEYS

Patented Feb. 21, 1939

2,148,228

UNITED STATES PATENT OFFICE 2,148,228

ELECTRODE

Robert R. Applegate, Shaker Heights, Ohio

Application June 2, 1937, Serial No. 145,999

3 Claims. (Cl. 219—8)

This invention relates to an electrode, and is a continuation in part of my copending application, Serial No. 1,020, filed January 9, 1935, and issued June 8, 1937, as Patent No. 2,083,309.

Heretofore, welds having a satisfactory degree of ductility have necessitated a heavy coating on the weld rod that is more or less frangible and difficult to penetrate. Accordingly, it has not been satisfactory for use with apparatus wherein the electrode is fed from a reel downwardly through the head of a welding machine. The inability to maintain a current conducting contact between the contactor and electrode therefore has necessitated a dust-like covering for the electrode which is far inferior to the heavy coated rod insofar as the ductility of the resulting weld is concerned. Furthermore, there is a disadvantage in winding a heavy-coated electrode upon a reel because the coating will crack and chip off, whenever the electrode is bent at an angle that would be necessary to encircle a reel of the size that is customarily used on welding heads.

An object of my invention, therefore, is to make an electrode which can be fed through the head of a welding machine, and yet, which possesses the advantages of a heavy-coated electrode.

An additional object is to make an electrode which may readily be used as a fillet for joining together two strips of metal and which when so used will produce a weld of satisfactory ductility.

Figure 1:
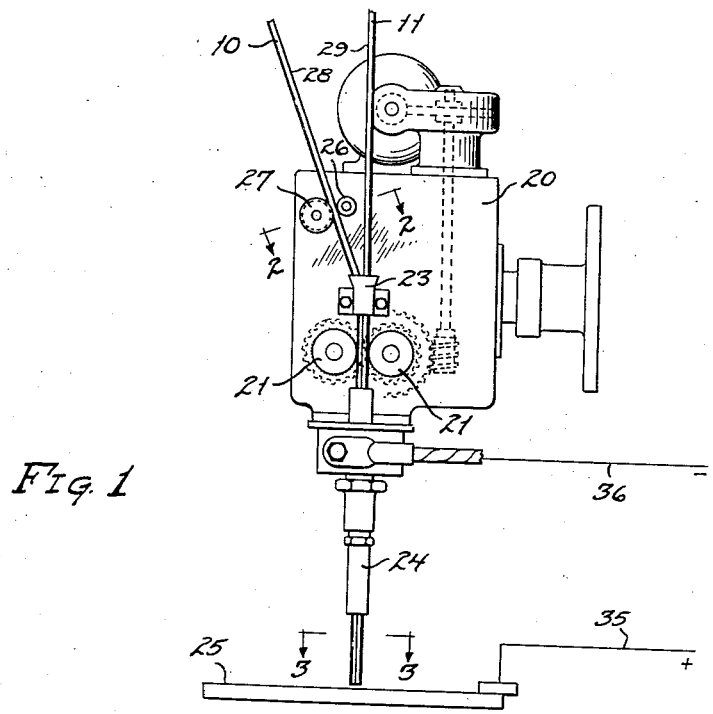
Figure 2:
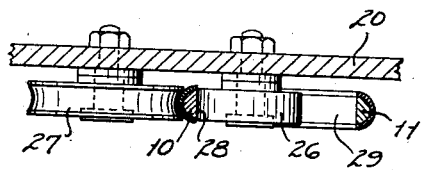
Figure 3:
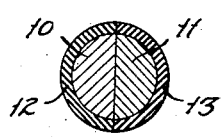
Figure 4:
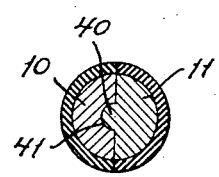
Figure 5:
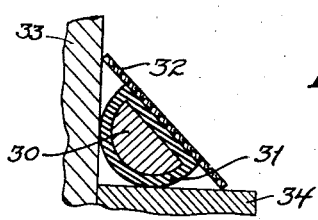

Referring now to the drawing, Fig. 1 is a diagrammatic view of a welding head having an electrode embodying my invention being fed therethrough; Figs. 2 and 3 are sections taken on the correspondingly numbered lines in Fig. 1; Fig. 4 is a section taken through the electrode, showing a modified form of construction, and Fig. 5 is a section through an electrode showing a further modified form of construction.

The electrodes which I propose to use are those which have a relatively heavy coating that is applied in the form of a sleeve to the electrode, and usually by an extruding process. I am not concerned, in this application, with details of which the covering is made, it being sufficient to state that any commercial form of heavy covering may be utilized. In general, my invention is practiced by utilizing two half-section bars, which are only partially coated and which are brought together along the uncoated faces, with the result that the half-sections cooperate to form a complete section that has a substantially continuous heavy covering at the line of weld. In Fig. 3, two half-sections are indicated at 10 and 11, as having a coating indicated at 12 and 13. The coating extends only along the curved surfaces of the sections, and thereby forms a complete envelope for the electrode when the sections are fed together through a welding machine.

In Fig. 1 a conventional form of welding head is indicated at 20, as having spaced feed rolls 21, which are driven through suitable gearing by an electric motor. The electrode sections are fed downwardly between the rolls through a guide 23, that is carried by the head directly above the rolls, and then through a tube 24, from whence they project in close proximity to the work 25. One of the half-sections in the arrangement illustrated in Fig. 1, is passed between a pressure roll 27 and a current conducting contactor roll 26, while the other electrode 11 is spaced from the contactor. The two electrode sections are so positioned, with reference to each other, however, that the flat uncoated surfaces 28 and 29 are placed in facing and converging relationship, wherefore they are gradually brought together and pressed into current conducting relationship by the feed rolls 21.

In the diagram shown in Fig. 1, one lead for the current is indicated at 35, as being electrically connected to the work while the other lead is indicated at 36, as being connected through the head to the contactor roller 26. That portion of the conductor 36 which passes through the head is insulated from it. In Fig. 4, I have shown a modification of the electrode construction, in which the flat faces have a tongue and groove interconnection, which operates to insure accurate alignment of the two sections, as they project from the welding head. In such illustration, the electrode 11 has a tongue 40 while the electrode 10 has a coacting groove 41. The tongue and groove prevent any possible tendency for lateral misalignment of the electrodes during the welding operation.

The modification of Fig. 5 comprises a half round metallic section 30 which is coated on all surfaces as at 31 and which has a strip 32 of organic material, such as cotton, or paper attached to the flat surface and preferably overhanging the longitudinal edges thereof. This section when placed adjacent the joint between two strips 33 and 34 to be welded fills the joint and makes a satisfactory fillet therebetween.

An important advantage of the present invention is the fact that heavily coated weld rods may be fed through the head of a welding machine, and that welds of the desired degree of ductility can thereby be readily obtained. Furthermore, the invention is readily adapted for use with existing welding machines, without necessitating extensive changes in the construction thereof, and without requiring the coating to be pierced at any point during the feeding operation.

I claim:

1. An electrode having portions thereof adapted to bear against two pieces of metal that are to be welded and having a strip of organic material attached thereto and extending diagonally of said pieces on which the electrode is supported.

2. An electrode comprising a half section of metal that is coated on all faces thereof and having a strip of organic material attached to one of the faces of the electrode.

3. An electrode comprising a strip of metal having a cross-sectional shape in the form of half of a regular geometrical shape and having a strip of organic material attached thereto, the strip having portions thereof overhanging the longitudinal edges of the electrode and providing a support for holding it in welding position upon the work to be welded.

ROBERT R. APPLEGATE.